Patented Sept. 21, 1954

2,689,851

UNITED STATES PATENT OFFICE 2,689,851

ERGOTAMINE PHTHALATE

George S. Shahovskoy and Gordon H. Svoboda, Indianapolis, Ind., assignors to Eli Lilly and Company, Indianapolis, Ind., a corporation of Indiana No Drawing. Application April 29, 1953, Serial No. 352,028

1 Claim. (Cl. 260—285.5)

This invention relates to salts of ergot alkaloids and more particularly to ergotamine phthalate.

The isolation and purification of the useful alkaloids from ergot is difficult, for the reason that the alkaloid bases and their common organic and inorganic salts are easily decomposed and transformed into dark amorphous products. Light, oxygen, and reactive substances such as acids and alkalies bring about the decomposition of the alkaloids and their salts and even solvents adversely affect them by converting them from the physiologically active, levorotatory form to the inactive dextrorotatory form. A further hindrance to the isolation of ergot alkaloids in pure form is their property of crystallizing as mixtures of several different alkaloids. In the past, this unorthodox behavior has led to much confusion for crystalline substances were sometimes obtained which were considered as being unitary, single alkaloids, but were later found to be isomorphic mixtures of alkaloids.

Attempts have been made to provide salts of the ergot alkaloids which were more stable than their corresponding bases, and which by avoiding the difficulties enumerated above would make possible the separation of those alkaloids in pure form. In U. S. Patent No. 2,220,801, there are described salts of ergonovine with certain aliphatic dicarboxylic acids.

Likewise, in U. S. Patent No. 2,447,214 there are described acid salts of ergotoxine, ergocristine, ergobasinine, ergobasine and the like with aroylated tartaric acids. The salts described in those patents are stable and can be recrystallized without loss. However, salts made from ergotamine and any of the acids disclosed in the prior art rapidly decompose when they are subjected to the action of light, air, and solvents, as during the isolation of ergotamine from crude ergot. Thus the salts shown to be of utility in the preparation and use of some other ergot alkaloids are of substantially no value in the case of ergotamine. It has heretofore been difficult to isolate ergotamine in pure form, and has proven to be unfeasible to recrystallize ergotamine or its salts with the heretofore described acids since a substantial loss of potency occurs upon each recrystallization.

We have discovered a novel ergotamine salt, the phthalic acid salt of ergotamine. The new salt is very stable, and can be subjected to crystallization and other procedures for the purpose of isolating and purifying ergotamine. Furthermore, the new salt can be reconverted to ergotamine base, from which other salts that are desirable for use in the therapeutic administration of ergotamine can be prepared.

The phthalic acid salt of ergotamine separates preferentially to most of the phthalate salts of the other ergot alkaloids which may be formed. Thus, the salt can be precipitated or crystallized preferentially out of solution in substantially purified form. The salt can be recrystallized without decomposition to bring about its complete purification.

Although salts prepared from ergotamine with hitherto described acids commonly combine in the proportion of two mols. of ergotamine to one mol. of acid as well as one mol. of ergotamine to one mol. of acid, the phthalic acid salt of ergotamine apparently forms onl yin equimolecular proportions.

The following examples more specifically illustrate our method of obtaining ergotamine phthalate and the preparation properties, and use of the phthalate salt.

Example 1

Two kgs. of ergot (cultivated Swiss ergot) are coarsely pulverized and mixed with a solution of 200 g. of crystalline aluminum sulfate in 300 cc. of water. The moist mixture is finely ground, moistened with 1.5 liters of benzene and extracted exhaustively with benzene in a percolator. The exhausted marc is suspended in 4 liters of benzene and ammonia gas is bubbled into the suspension to liberate the bases of the ergot alkaloids. The benzene is removed by suction filtration and the residue is washed with successive portions of benzene until an evaporated sample shows no further Keller's reaction with iron chloride. The alkaline benzene extract and subsequent washings are combined and petroleum ether is added until no further precipitation takes place. The precipitate, comprising a mixture of crude ergot alkaloids including ergotamine, is removed by filtration and dried.

6.3 g. of crude ergot alkaloids in basic form obtained as set out above by the precipitation of a benzene extract of ergot of rye with petroleum ether are dissolved in 4 liters of ethyl ether. Any insoluble material is filtered off, and to the clear filtrate is added a solution of 2 g. of phthalic acid in a mixture of 10 cc. of methanol and 300 cc. of ether. An immediate precipitate comprising the phthalic acid salt of ergotamine is formed as a light yellow, amorphous solid. The solid is removed by filtration, washed with ether and dried. The dry powder, weighing about 3.7 g., is readily crystallized and repeatedly recrystallized without loss from acetone.

Crystalline ergotamine phthalate thus prepared and crystallized consisted of large rhombic plates having a profile angle of 82°, and indices of refraction $N_1=1.630$ and $N_2=1.545$; and melted at about 182° C. with decomposition. The crystals were solvated and contained 2 mols. of water, which could be removed by warming the salt in an Abderhalden drier. The molecular weight as determined by electrometric titration was $780\pm8$. The specific rotation of the salt in methanol solution was $[\alpha]_D^{20°}=63°$.

*Analysis.*—Calculated for $C_{41}H_{41}N_5O_9 \cdot 2H_2O$: C, 62.78; H, 5.74; N, 8.93. Found: C, 62.63; H, 5.61; N, 9.03.

When tested physiologically by the Broom-Clark method, the ergotamine phthalate was equivalent in activity to ergotamine tartrate. Ergotamine phthalate can be used therapeutically for the same purposes as ergotamine tartrate.

Example 2

40 cc. of an 0.5 percent solution of ammonium hydroxide was placed in a separatory funnel and one gram of ergotamine phthalate was added. The mixture was shaken until the previously crystalline material became flocculent, and was extracted with three 30 cc. portions of chloroform. The combined chloroform extracts were filtered through a funnel containing anhydrous sodium sulfate, and the filtrate was evaporated to dryness. The residue, comprising ergotamine base, was dissolved in 150 cc. of thiophene-free benzene. The solution was filtered, and allowed to stand at room temperature whereupon crystals of ergotamine formed. The solution was refrigerated until crystallization was completed, and the resulting crystalline ergotamine base was filtered off, washed with cold pentane and dried in a desiccator over sulfuric acid.

Ergotamine base thus prepared from ergotamine phthalate melted over a range from about 172° C. to about 182° C. The specific rotation of the base was $[\alpha]_D^{20°}=-156°$ in chloroform solution.

Example 3

To a solution of 0.5 g. of tartaric acid in 15 ml. of boiling ethanol is added a solution of 2.5 g. of ergotamine base in 15 ml. of ethanol. Upon cooling the mixture, crystals of ergotamine tartrate separate.

We claim:

The phthalate acid salt of ergotamine.

References Cited in the file of this patent

UNITED STATES PATENTS

| Number | Name | Date |
|---|---|---|
| 2,220,801 | Kharasch et al. | Nov. 5, 1940 |
| 2,447,214 | Stoll et al. | Aug. 17, 1948 |